US012664566B2

(12) United States Patent
Ta et al.

(10) Patent No.: US 12,664,566 B2
(45) Date of Patent: Jun. 23, 2026

(54) SYSTEM AND METHOD FOR MOBILE PLATFORM LOCATION MANAGEMENT

(71) Applicant: Productive Application Solutions, Inc., Sheridan, WY (US)

(72) Inventors: Peter Ta, Tucson, AZ (US); Jeffery Hursh, Tucson, AZ (US)

(73) Assignee: Productive Application Solutions, Inc., Sheridan, WY (US)

( * ) Notice: Subject to any disclaimer, the term of this patent is extended or adjusted under 35 U.S.C. 154(b) by 0 days.

(21) Appl. No.: 18/779,003

(22) Filed: Jul. 21, 2024

(65) Prior Publication Data

US 2025/0232335 A1     Jul. 17, 2025

Related U.S. Application Data

(63) Continuation of application No. 17/903,096, filed on Sep. 6, 2022, now Pat. No. 12,045,858, which is a
(Continued)

(51) Int. Cl.
G06Q 30/0251     (2023.01)
G05D 1/00     (2024.01)
(Continued)

(52) U.S. Cl.
CPC ....... G06Q 30/0266 (2013.01); G05D 1/0022 (2013.01); G05D 1/0094 (2013.01);
(Continued)

(58) Field of Classification Search
CPC ........... G06Q 30/0244; G06Q 30/0252; G06Q 30/0267
(Continued)

(56) References Cited

U.S. PATENT DOCUMENTS 4,259,660 A * 3/1981 Oliver ................. B60Q 1/2611
                                                   116/40
6,971,070 B2 * 11/2005 Obradovich .......... B60W 50/14
                                                   715/835
(Continued)

FOREIGN PATENT DOCUMENTS

FR         2578996 A1 * 9/1986 ............. G09F 21/04
GB         2402254 A * 12/2004 .......... G06Q 20/127
(Continued)

OTHER PUBLICATIONS

· Jingbin Liu et al. iParking: An Intelligent Indoor Location-Based Smartphone Parking Service. (Oct. 31, 2012). Retrieved online Aug. 26, 2020. https://www.ncbi.nlm.nih.gov/pmc/articles/PMC3522932/ (Year: 2012).*
(Continued)

*Primary Examiner* — James A Reagan
(74) *Attorney, Agent, or Firm* — Law Office of Gerald Maliszewski; Gerald Maliszewski

(57) ABSTRACT

A system and method are provided for location-targeting the provision of media distributed by a mobile platform. The method provides a mobile platform with an attached media projection subsystem, and an identifier associated with the media projection subsystem. The media projection subsystem is selectively enabled, the geographic location of the mobile platform is determined, and the identifier and the enablement of the media projection system are verified. Verification information, including the mobile platform (media projection subsystem) location, identifier, and enablement of the media projection subsystem is communicated to a server and stored in a non-transitory memory. A targeting application may direct the system to a target location in cooperation with analyzing the verification information, weighted for factors such as proximate vehicular traffic, line of sight, proximate pedestrian traffic, proximity to cultural
(Continued)

events, proximity to cultural facilities, the time of day, and the length of time the media is being projected.

19 Claims, 8 Drawing Sheets

Related U.S. Application Data continuation of application No. 17/007,575, filed on Aug. 31, 2020, now Pat. No. 11,468,477, which is a continuation of application No. 16/869,696, filed on May 8, 2020, now Pat. No. 10,803,488, which is a continuation of application No. 16/601,362, filed on Oct. 14, 2019, now Pat. No. 10,796,340.

(60) Provisional application No. 62/779,972, filed on Dec. 14, 2018.

(51) Int. Cl.

| | |
|---|---|
| *G05D 1/226* | (2024.01) |
| *G05D 1/689* | (2024.01) |
| *G06F 16/487* | (2019.01) |
| *G06Q 30/0242* | (2023.01) |

(52) U.S. Cl.
CPC ............. *G05D 1/226* (2024.01); *G05D 1/689* (2024.01); *G06F 16/487* (2019.01); *G06Q 30/0244* (2013.01); *G06Q 30/0252* (2013.01); *G06Q 30/0267* (2013.01)

(58) Field of Classification Search
USPC .......... 705/14.63, 14.62, 14.49, 14.4; 725/32
See application file for complete search history.

(56) References Cited

U.S. PATENT DOCUMENTS

| | | | | |
|---|---|---|---|---|
| 7,347,017 | B2 * | 3/2008 | Shaffer, Jr. .............. | G09F 21/04 |
| | | | | 296/21 |
| 7,463,898 | B2 * | 12/2008 | Bayne ................. | H04M 1/0247 |
| | | | | 455/575.1 |
| 8,712,630 | B2 * | 4/2014 | Walwer .............. | G06Q 30/0273 |
| | | | | 705/14.62 |
| 9,076,336 | B2 * | 7/2015 | Tippelhofer ........... | G08G 1/148 |
| 9,939,287 | B2 * | 4/2018 | Castellucci ........ | G01C 21/3476 |
| 10,382,579 | B2 * | 8/2019 | Mevissen .............. | H04L 67/306 |
| 10,482,766 | B2 * | 11/2019 | Mowatt .................. | G08G 1/144 |
| 10,733,891 | B2 * | 8/2020 | Chow ...................... | G08G 1/04 |
| 11,270,349 | B2 * | 3/2022 | Maliszewski ........ | H04N 9/3194 |
| 2002/0009978 | A1 * | 1/2002 | Dukach ................... | G08G 1/01 |
| | | | | 455/99 |
| 2006/0129451 | A1 * | 6/2006 | Kohanim .............. | G06Q 30/02 |
| | | | | 705/14.58 |
| 2006/0265922 | A1 * | 11/2006 | Shaffer, Jr. ........... | G09F 21/048 |
| | | | | 40/591 |
| 2009/0084009 | A1 * | 4/2009 | Vandergriff ............ | G09F 13/18 |
| | | | | 40/546 |
| 2011/0131235 | A1 * | 6/2011 | Petrou .................. | G06F 16/532 |
| | | | | 707/769 |
| 2012/0245966 | A1 * | 9/2012 | Volz ....................... | G06Q 10/02 |
| | | | | 705/5 |
| 2013/0304565 | A1 * | 11/2013 | Saccoman .......... | G06Q 30/0242 |
| | | | | 705/14.41 |

| | | | | |
|---|---|---|---|---|
| 2013/0307706 | A1 * | 11/2013 | Kriezman .............. | B60Q 1/503 |
| | | | | 340/988 |
| 2014/0214319 | A1 * | 7/2014 | Vucetic .............. | G01C 21/3446 |
| | | | | 701/533 |
| 2014/0309865 | A1 * | 10/2014 | Ricci ...................... | G06F 3/0481 |
| | | | | 701/36 |
| 2015/0123818 | A1 * | 5/2015 | Sellschopp ...... | G08G 1/096816 |
| | | | | 340/932.2 |
| 2015/0254721 | A1 * | 9/2015 | Rad .................... | G06Q 30/0266 |
| | | | | 705/14.63 |
| 2015/0279210 | A1 * | 10/2015 | Zafiroglu ............... | G08G 1/065 |
| | | | | 340/932.2 |
| 2016/0116293 | A1 * | 4/2016 | Grover ................... | G01C 21/34 |
| | | | | 701/23 |
| 2016/0191879 | A1 * | 6/2016 | Howard .............. | H04N 9/3147 |
| | | | | 348/745 |
| 2016/0267539 | A1 * | 9/2016 | Saah ........................ | H04W 4/80 |
| 2016/0292744 | A1 * | 10/2016 | Strimaitis .......... | G06Q 30/0269 |
| 2017/0132960 | A1 * | 5/2017 | Kis-Benedek Pinero ................... |
| | | | | G06F 1/1637 |
| 2017/0309170 | A1 * | 10/2017 | Wang ...................... | G08G 1/146 |
| 2018/0186309 | A1 * | 7/2018 | Batten ...................... | B60Q 1/56 |
| 2018/0186311 | A1 * | 7/2018 | Mason .................... | B60R 21/01 |
| 2019/0121522 | A1 * | 4/2019 | Davis .................. | G06F 3/04815 |
| 2019/0135180 | A1 * | 5/2019 | Watatsu .................... | B60R 1/00 |
| 2021/0001724 | A1 * | 1/2021 | Dobashi ................. | B60K 35/00 |

FOREIGN PATENT DOCUMENTS

| | | | | | |
|---|---|---|---|---|---|
| JP | 2010026474 | A | * | 2/2010 | .......... G09F 21/048 |
| JP | 2018072077 | A | * | 5/2018 | ............ G01S 19/14 |
| JP | 2018205399 | A | * | 12/2018 | ............ G09F 21/04 |
| WO | WO-2008135617 | A1 | * | 11/2008 | .......... G08G 1/0175 |

OTHER PUBLICATIONS

· Ted Morris et al. A Comprehensive System for Assessing Truck Parking Availability Final Report. (Jan. 2017). Retrieved online Aug. 26, 2020. https://www.dot.state.mn.us/ofrw/PDF/assessing-truck-parking.pdf (Year: 2017).*
· Mateusz Jozef Kulesza. E-Park: Automated-Ticketing Parking Meter System. (Apr. 2, 2015). https://dash.harvard.edu/bitstream/handle/1/17417570/KULESZA-SENIORTHESIS-2015.pdf?sequence=1&isAllowed=y (Year: 2015).*
Florian Alt. A Design Space for Pervasive Advertising on Public Displays. (Jul. 12, 2012). Retrieved online Aug. 13, 2020. https://pdfs.semanticscholar.org/4bef/aba88eb1d14e81dcd610658bccbbf287b770.pdf (Year: 2012).*
Ben Coxworth. Truck-mounted billboards morph with the miles. (Sep. 12, 2016). Retrieved online Aug. 13, 2020. https://newatlas.com/roadads-eink-truck-billboards/45380/ (Year: 2016).*
Technoframe. LED BUS Screens. (Nov. 18, 2011). Retrieved online Aug. 13, 2020. https://technoframe.com/led-bus-screens (Year: 2011).*
Technobob. MMOV Takes Projection Mapping on the Road. (May 11, 2011). Retrieved online Jul. 11, 2021. https://technabob.com/blog/2011/05/11/mmov-projection-mapping-vehicle/ (Year: 2011).*
The Graffiti Research Lab. Projection Bombing. (circa 2008). Retrieved online Jul. 11, 2021. https://www.instructables.com/PROJECTION-BOMBING/ (Year: 2008).*
Projectable Objects. Tutorial: The Easier Way to Projection Map for Advertisement on a Building. (Oct. 13, 2014). Retrieved online Jul. 11, 2021. https://projectileobjects.com/2014/10/13/the-easier-way-to-projection-map-for-advertisement-tutorial/ (Year: 2014).*

* cited by examiner

602

CAR COVER

MEDIA
MESSAGE

XXX001

START ~900

902

PROVIDING MEDIA PROJECTION SUBSYSTEM

903a

UPLINKING MEDIA

903b

UPLINKING MAP

904

ENABLING MEDIA PROJECTION SYSTEM

906

DETERMINING LOCATION

908

VERIFYING IDENTITY AND ENABLEMENT

910

COMMUNICATING VERIFICATION INFORMATION

912

SERVER ACCEPTING VERIFICATION INFORMATION

914

STORING VERIFICATION INFORMATION

916

TARGETING LOCATION

918

COMMUNICATING CAMERA IMAGES

SYSTEM AND METHOD FOR MOBILE PLATFORM LOCATION MANAGEMENT

RELATED APPLICATIONS

Any and all applications, if any, for which a foreign or domestic priority claim is identified in the Application Data Sheet of the present application are hereby incorporated by reference under 37 CFR 1.57.

BACKGROUND OF THE INVENTION

Field of the Invention

This invention generally relates to position monitoring networks and, more particularly, to a system and method for location-targeting the delivery of media from a mobile platform.

Description of the Related Art

Humans spend more and more time in their automobiles driving to work and to other lifestyle activities, as well as travel. In the United States, the average American spends approximately 10 minutes per day in an automobile. Approximately 90% of Americans own cars and over 75% drive to work every day. A record 107 million Americans have automobile debt and make monthly payments. The outdoor advertising industry aimed at targeting these drivers is estimated at $8 billion each year.

There exist many systems that attempt to take advantage of human user mobility to implement advertising and media distribution. US 2013/0304565, entitled "System and Method for Advertising on Mobile Platforms", and US 2016/0267539, entitled "Individual and Fleet-Based Vehicle-Based Wireless Marketing Device" disclose such systems. U.S. Pat. No. 8,010,134, entitled "Architecture for Mobile Advertising with Location", discloses a system that uploads particular media content to a mobile device based upon the mobile device location. U.S. Pat. No. 7,463,898, entitled "System and Method for the Distribution of Advertising and Associated Coupons via Mobile Media Platforms", describes a similar concept. U.S. Pat. No. 8,712,630, entitled "Mobile Advertising and Compensation-Verification System" describes a system where a display with an embedded power source and Global Position System (GPS) receiver is adhesively attached to a vehicle. The owner of the vehicle is rewarded for the number of miles the vehicle is driven. The installation of the display is verified by recording a cell phone picture. The system includes a GPS device with a transmitter, shown communicating with a GPS satellite, that allegedly prevents tampering or removal of the display after its installation. However, as is well known in the art, GPS satellites only transmit data to users—they do not receive or otherwise uplinked data from users. Similarly, although an EEPROM device is described for storing location information and distance data, no means is presented for downloading this data to the central entity computerized database that is tasked with distributing rewards.

It would be advantageous if the time and location of a portable media presentation could be tracked and recorded.

It would be advantageous if the media presentation could be selectively enabled.

It would be advantageous if the above-mentioned media presentation could be accurately and continuously verified.

It would be advantageous if the system included a targeting mechanism to suggest that the media be presented in desired target locations.

It would also be advantageous if the enablement of media presentation of the location of the media presentation could be verified remotely, without requiring the employment of a human.

SUMMARY OF THE INVENTION

A system and method are disclosed herein that encompass remotely deployable and activated automated signage. In one aspect, the signage is a vehicle cover that displays advertising and is integrated, for example, with a mobile phone software application to provide a means of directing the signage to prime locations. Alternatively, the vehicle driver may manually deploy the vehicle cover and the device functions in the same manner. In one aspect, the mobile sign advertising system is enabled as a vehicle roof mounted all-weather device that upon remote instruction from an vehicle operator deploys and retracts a cover made of cloth or other pliable material over and across a vehicle, either manually or using an electric motor (battery, vehicle sourced, or solar powered). Thus, the system creates a mobile advertising platform that seeks to expand and capture market share within the outdoor advertising market segment by directing the selective deployment of media to preferred target locations, as well as (optionally) providing the automobile protection from the elements.

The cover may display an advertising message, coupon, or logo. The vehicle cover may be deployed automatically or manually by the vehicle operator by removing the cover from the housing. The roof mounted device may contain side panels displaying logos that may remain in place on the exterior of the vehicle roof during transport and may be affixed to the exterior of the vehicle roof by magnets or suction cups or pads, or the roof mounted device may be removed and stored in the vehicle following retraction of the cover by the internal motor or manually by the vehicle operator. The roof mounted device may also contain a halo of LED lights located under a fin that directs emitting light downward onto the cover to illuminate the cover during darkness or low light periods. The LED lights may be powered by a battery contained in the device housing or an electrical system connected to the vehicle's power source. Once in a stationary position, a receiver located in the roof mounted device can be activated remotely by an electrical signaling device (such as Bluetooth, cellular, or WiFi) to deploy and retract the cover through a proprietary software application on the operator's mobile phone. Alternatively, the system and communications are initiated by deploying the cover. The mobile phone software application may transmit the following information to the owner of the proprietary software: (i) a unique identifier for the device in use (for example, radio-frequency identification) and the operator of the vehicle assigned or in possession of the device, (ii) the time, date, duration and location (using mobile-satellite triangulation systems or radio-frequency identification systems) that the device or the person manually deployed or retracted the presentation media, and (iii) a photographic image of the vehicle with the cover deployed. The proprietary software may utilize graphic information system (GIS) mapping technology to compensate the operator of the vehicle for parking the vehicle in specified locations as identified in the mobile phone software application.

Accordingly, a method is provided for monitoring the provision of media distributed by a mobile platform. The method provides a mobile platform with an attached media projection subsystem, and an identifier (e.g., serial number) associated with the media projection subsystem or the mobile platform. Examples of a mobile platform include a self-powered vehicle, a towed trailer or sign, a shopping cart, a drone, or even a backpack. The media projection subsystem is selectively enabled, and may be a car cover, retractable screen, or a broadcasted sound to name a few examples. In one aspect of the method, media uploads are received from a server and projected by the media projection subsystem.

The method determines the geographic location of the mobile platform, and verifies the identifier and the enablement of the media projection system. Verification information, including the mobile platform (or media projection subsystem) location, identifier, and enablement of the media projection subsystem, is communicated to a server and stored in a non-transitory memory.

Typically, the identifier is associated with an entity such as a person, business, or corporation. Then, a targeting application, stored in the server memory, enables a sequence of processor executable instructions for directing the entity to a target location in cooperation with analyzing the verification information. For example, the target location may be selected from a plurality of value weighted target locations. More explicitly, the target location may be weighted in response to geographic location factors such as proximate vehicular traffic, line of sight, proximate pedestrian traffic, proximity to cultural events, proximity to cultural facilities, and combinations thereof. Otherwise, the target location may be weighted in response to factors such as the type of media being projected, the time of day, the day of the week, the date, the length of time the media is being projected, and combinations thereof.

In one aspect, the identifier and media projection system include short-range wireless devices transmitting, respectively, an identification code and an enablement signal. A personal communications device, enabled for example as a smartphone, includes a wireless device to receive the identification code and enablement signal, and a global positioning system (GPS) receiver for determining the mobile platform location. A verifier software application, stored in a non-transitory memory, is enabled as a sequence of processor executable instructions for verifying the identification code and the enablement of the media projection subsystem, and providing verification information. The verifier may be embedded with the personal communications device or the server. Alternatively, a GPS receiver, the identifier, and a communication subsystem are embedded with the media projection subsystem.

In another aspect, the identifier is an identification code physically marking the media projection subsystem. Then, a personal communications device with a camera photographs the identification code and the deployment of the media projection subsystem. The step of verifying the identifier and the enablement of the media projection system includes recognizing the photographs of the identification code and media projection subsystem deployment, respectively, as the identifier and the enablement of the media projection subsystem.

In another aspect, the method provides a camera embedded with media projection subsystem, and images recorded by the camera are communicated to the server for storage in memory. The value of the target location provided to the entity may then be modified based upon the information provided in the images. Alternatively, the camera images may be used to verify the enablement of the media projection subsystem.

Additional details of the above-described method, a mobile media distribution system, a system for monitoring the occupation of a geographic location by a mobile platform, and a system for monitoring the provision of media distributed by a mobile platform are provided below.

DETAILED DESCRIPTION

Figure 1A:
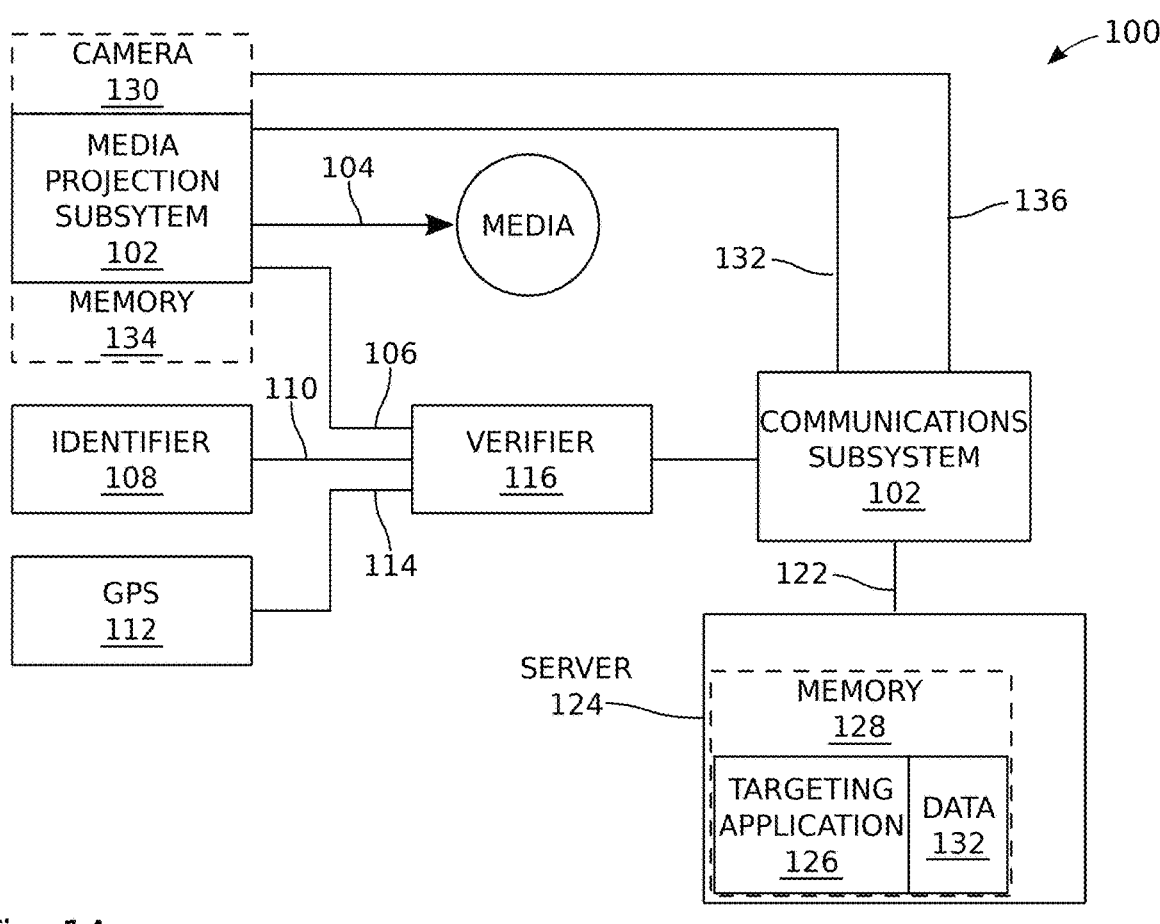
FIGS. 1A and 1B are schematic block diagrams of a mobile media distribution system.
Figure 1B:
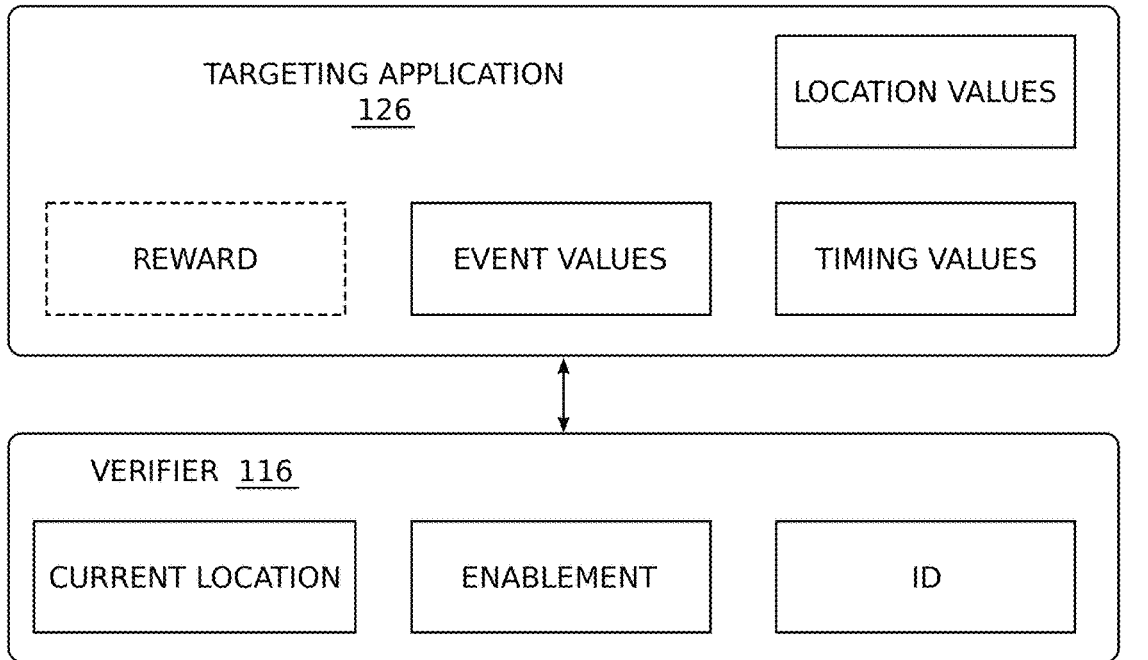

FIGS. 1A and 1B are schematic block diagrams of a mobile media distribution system. The system 100 comprises a selectively enabled media projection subsystem 102 having an interface 104 to project media and an interface on line 106 to supply an enablement signal in response to the media projection subsystem being enabled. Typically, the media projection subsystem 102 displays a media image. Alternatively, or in addition, the media projection subsystem 102 may broadcast audio information or sounds.

An identifier 108 is associated with the media projection system 102, and has an interface on line 110 to supply an identification code. A location device 112, here depicted as a global positioning system (GPS) receiver, supplies the geographic location of the media projection subsystem 102 via interface 114. The system 100 is not limited to any particular type of location means. For example, a LORAN receiver would be suitable to enable the system. Otherwise a LoJack® type system might be adapted for the purpose of location. However, at the time of this writing, inexpensive commercial available GPS receivers are highly accurate and easy to procure. For the sake of simplicity, the location device is typically described as a GPS receiver in the explanations below. A verifier 116 has interfaces connected on line 106 to receive the enablement signal, on line 110 to receive the identification code, and on line 114 to receive the geographic location. The verifier 116 has an interface on line 118 to supply verification information responsive to the enablement signal, the identification code, and the enablement signal. As explained in more detail below, depending on the particular application, the above-mentioned interface signals are communicated or downloaded via hardlines, wirelessly, or optically. A communications subsystem 120 has an interface on line 118 to receive verification information and an interface on line 122 to transmit the verification information to a server 124.

Figure 2A:
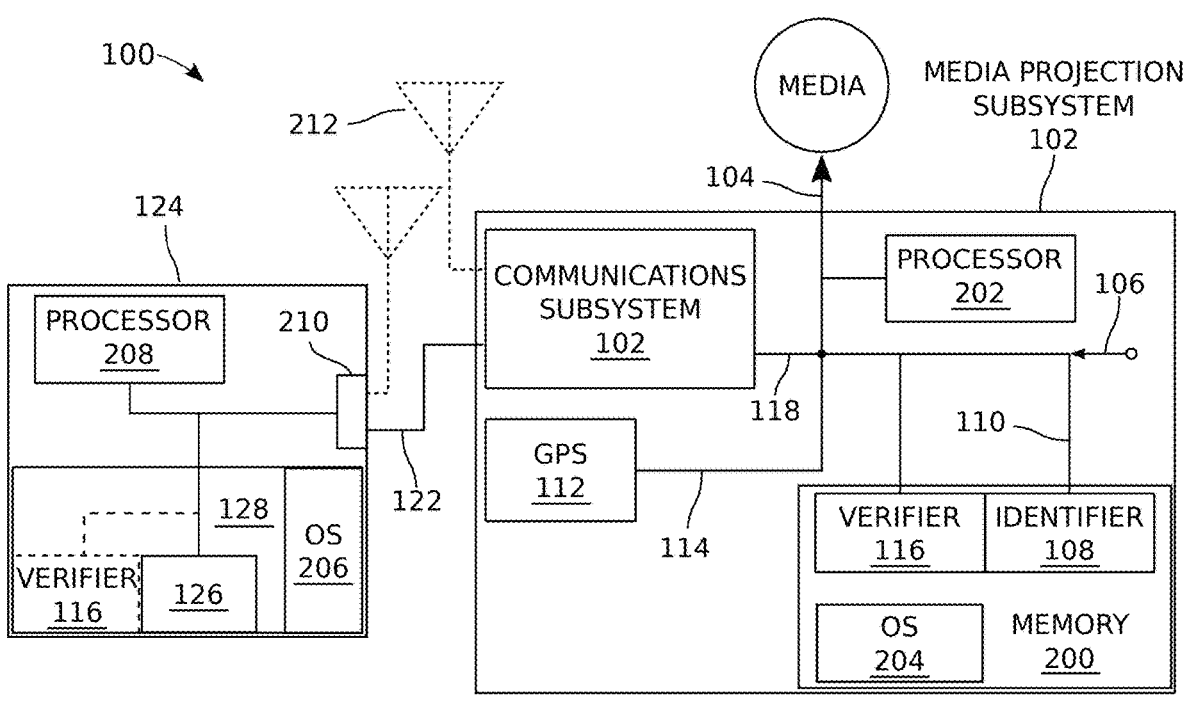
FIGS. 2A and 2B are schematic block diagrams depicting the system of FIGS. 1A and 1B as a stand-alone mobile media distribution system.
Figure 2B:
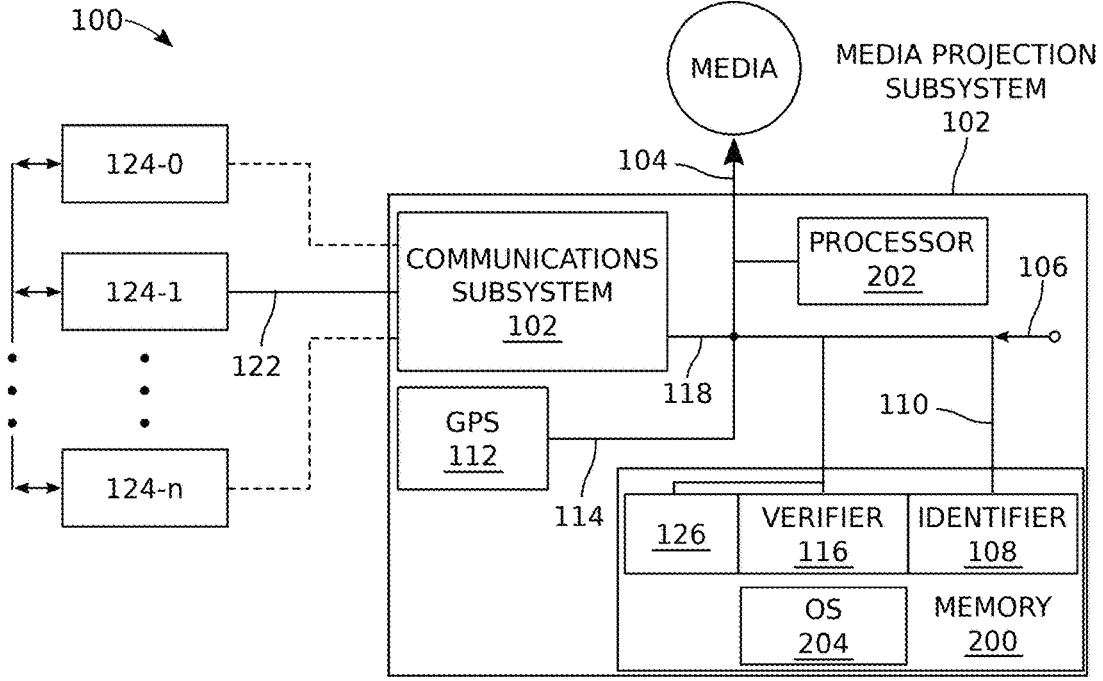

As used herein, a "server" may be defined as a central server, as shown in FIG. 1A, to which a plurality of media projection systems may report. Alternatively, as shown in FIG. 2B, the server may be a distributed network of servers, such as might be used in a peer-to-peer system. In general, communications may be stored and transmitted periodically, in which the communications between the communications subsystem 120 and the server 124 may be made via a hardline (e.g., Ethernet), or transmitted continuously using WiFi, cellular telephone, Bluetooth protocols to name a few examples. The communications are not limited to any particular type of protocol. In some aspects, the communications include both wireless and hardline protocols, such as a communication that begins wirelessly to a WiFi access point that subsequently is converted to an Ethernet protocol.

The non-transitory memories described herein may be any type or form of volatile or non-volatile storage device or medium capable of storing data and/or other computer-readable instructions. Examples of memories include, without limitation, Random Access Memory (RAM), Read Only Memory (ROM), flash memory, or any other suitable memory device. Although not required, in certain embodiments, the systems described herein may include both a volatile memory unit and a non-volatile storage device. The memory may be implemented as shared memory and/or distributed memory in a network device.

In one aspect, the identifier 108 is associated with a first entity. The first entity may be referred to as a legal entity in some aspects, examples of which include a human being, a business, or a corporation. A targeting software application 126 is stored in a non-transitory memory 128 of the server 124, enabling a sequence of processor executable instructions for directing or suggesting to the first entity (or media projection subsystem) a target location in cooperation with analyzing the verification information. In one aspect, the target location is predetermined. As such, portions of the system described herein that are enabled with software applications may be understood to be a type of computer system. As is well known in the art, a processor is used to implement the steps in a software application. The memory of the computer system typically includes some type of operating system (OS). To reduce the clutter in the drawings, and since the interaction with an OS, processor, and software application is so well understood, processors and OS software are not shown in this figure.

FIG. 1B depicts the interaction between components of the targeting application 126 and the verifier 116. In one aspect, as shown in FIG. 2A, the targeting application 126 and verifier 116 may be collocated in the same memory, or be combined as a single unified application. Otherwise, the various components depicted in FIG. 1B may be non-centrally distributed. In one aspect, the targeting application may optionally determine a reward for the first entity, as shown in phantom, in response to the media projection subsystem occupying the target location. The most obvious type of reward is money. However, the first entity may alternatively be rewarded with bitcoin, cryptocurrency, coupons, or services. In one aspect, the target location is selected from a plurality of weighted (in value of importance) target locations, in response to the specific geographic location of where the media projection subsystem is located.

For example, the target location may be weighted in response to geographic location factors such as proximate vehicular traffic, line of sight from a particular vantage point, proximate pedestrian traffic, proximity to cultural events, proximity to cultural facilities, and combinations thereof. A cultural event is generally understood to be an activity involving human beings. Likewise, a cultural facility is a facility used by human beings, such as a museum, office building, or grocery store parking lot. As a more explicit example, a target location may have a first value if the media projection subsystem 102 is enabled within X feet of a particular location, and second value, greater than the first value, if the media projection subsystem is enabled within X/2 feet of the same location. Other factors reflected in the weighting of the target locations may include the type of media being projected, the time of day, the day of the week, the date, the length of time the media is being projected, and combinations thereof. There may be locations, such as parks, hospitals, or freeways where signage or parking is legally restricted, and in one aspect these locations are given a target value of zero. In one aspect, the system may even prevent the enablement of the media projection subsystem in legally restricted areas. The system 100 described herein is not limited to any particular factors weighting a target location. The system is interactive in the sense that the first entity may select a deployment location after determining the value of a location. In this sense, the targeting application does not so much direct the media presentation subsystem to a particular predetermined location, as suggest multiple possible locations.

In another aspect shown in FIG. 1A, the system 100 further comprises an optional camera 130, shown in phantom, embedded with the media projection subsystem 102, and having an output on line 132 to supply images of the geographic location proximate to the media projection subsystem. The communications subsystem 120 receives the images from the camera and transmits them to the server. The camera images of the environment surrounding the media projection subsystem 102 may be stored as data 132 in memory for analysis. In one aspect, the camera images may be analyzed using an artificial intelligence (AI) application, in conjunction with stored map images, the combination of which operates as the location device 112. In this way, the system may "learn" to deployment media in the optimum locations.

The camera images may also be used to modify the value of the target location. For example, the recorded traffic in a location may be greater than anticipated, and the target value adjusted accordingly. That is, images recording higher pedestrian or vehicular traffic may have greater value. The data may be used to help determine the efficacy of the media or location. In one alternative aspect shown in phantom, the data recorded by the camera may be imprinted with the identifier 108, stored in a local memory 134 of the media projection subsystem, and subsequently downloaded through the communications subsystem 120 or through a memory peripheral, such as a thumb drive, which can be accessed by a third party, server provider, or first entity. Alternatively or in addition, the camera images my act to verify that the media projection subsystem 102 has been enabled. In one aspect, simply recording a change in images, and thus proximate traffic, can be used as a means for proving media projection subsystem enablement.

In one aspect, the communications subsystem 120 receives media uploads from the server 124 on line 122, and the communications subsystem provides the media uploads to the media projection subsystem 102 on line 136.

FIGS. 2A and 2B are schematic block diagrams depicting the system of FIGS. 1A and 1B as a stand-alone mobile media distribution system. A non-transitory memory 200 is embedded with the media projection subsystem 102. Likewise, the identifier 108, communications subsystem 120, and GPS receiver 112 are embedded with the media projection subsystem 102. As shown, the verifier 116 is software application enabled as a sequence of processor executable instructions, and stored in the memory 200, for processing the verification information. Alternatively, as shown in phantom, the verifier 116 may be embedded in the server memory 128. Although not explicitly depicted, communications between the media projection subsystem and the server may be relayed through the use personal communication devices or WiFi access points. In this example, the identifier 108 is a code loaded into memory 200, but alternatively it can be a mechanical device, such as a DIP switch often associated with garage door openers. The media projection subsystem enablement signal on line 106 may be triggered, for example, by the deployment of a screen displaying a media message. In one aspect, the media projection subsystem can be remotely enabled, using signals relayed by a personal communications device or embedded communications subsystem, from the server or from an entity (user) at a different location. For example, the media projection subsystem may be remotely enabled to project only in the daylight hours, and then remotely disabled at night.

In another aspect, a GPS antenna 212 (shown in phantom) may be embedded in the media projection mechanism, for example, if the mechanism is a screen or cover. Since location data is only collected when the screen is deployed, the collection of location data simultaneously proves the enablement of the media projection subsystem 102. Otherwise, a switch may be thrown that powers the GPS receiver when the media projection mechanism is deployed. Again, since location data is only collected when the media projection mechanism is deployed, the collection of location data simultaneously acts as proof of enablement. As yet another alternative, a powered GPS is shielded (e.g., by a metal cover) until the media projection mechanism is activated.

The verifier application 116 is enabled with the aid of processor 202 and OS 204. Also note that interfaces 106, 110, 114, and 118 may share the same bus line. Likewise, server 124 includes OS 206 and processor 208, with transceiver 210. For ease of understanding the above-described functions have been described as individual components. However, it should be understood that in practice, multiple functions may be performed in a single device or subsystem.

FIG. 2B depicts more of a peer-to-peer type system where the targeting application 126 is embedded in the memory of the media projection subsystem memory 200. In this case, the targeting application 126 may use the communications subsystem 120 to communicate with at least one server in the distributed network of servers 124-0 through 124-n. In one aspect, the distributed network of servers may be other media projections systems. As another alternative, each server in the distributed network may include targeting and verifier applications, and data storage block-chain mechanisms. If the system is enabled to reward users (entities) based upon time, location, and duration of media deployment, the rewards may also be managed using a block-chain mechanism.

Figures 3A, 3B:
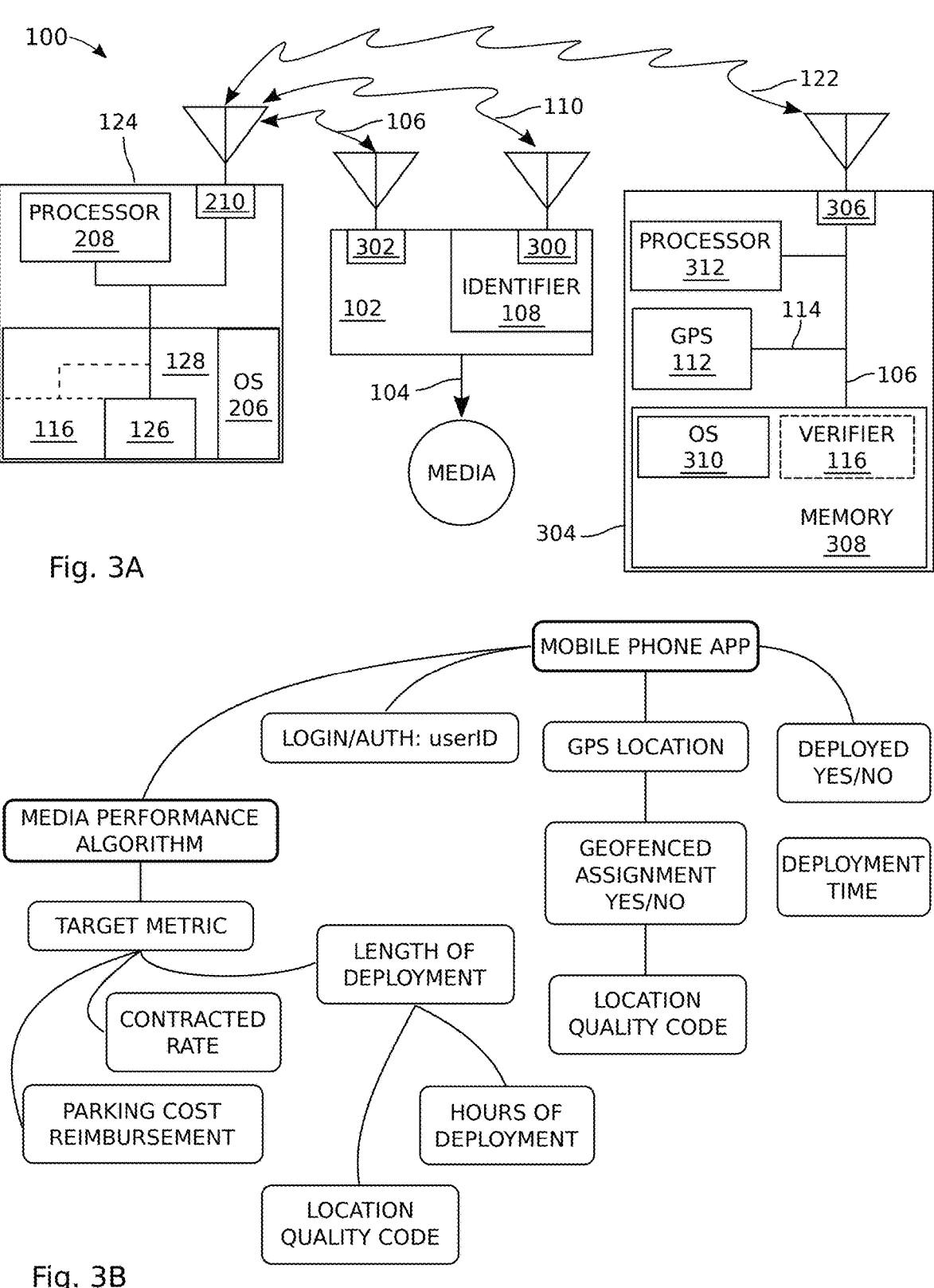
FIGS. 3A through 3C are a schematic block diagrams depicting the system of FIGS. 1A and 1B partially enabled with a personal communications device.
Figures 3C, 4:
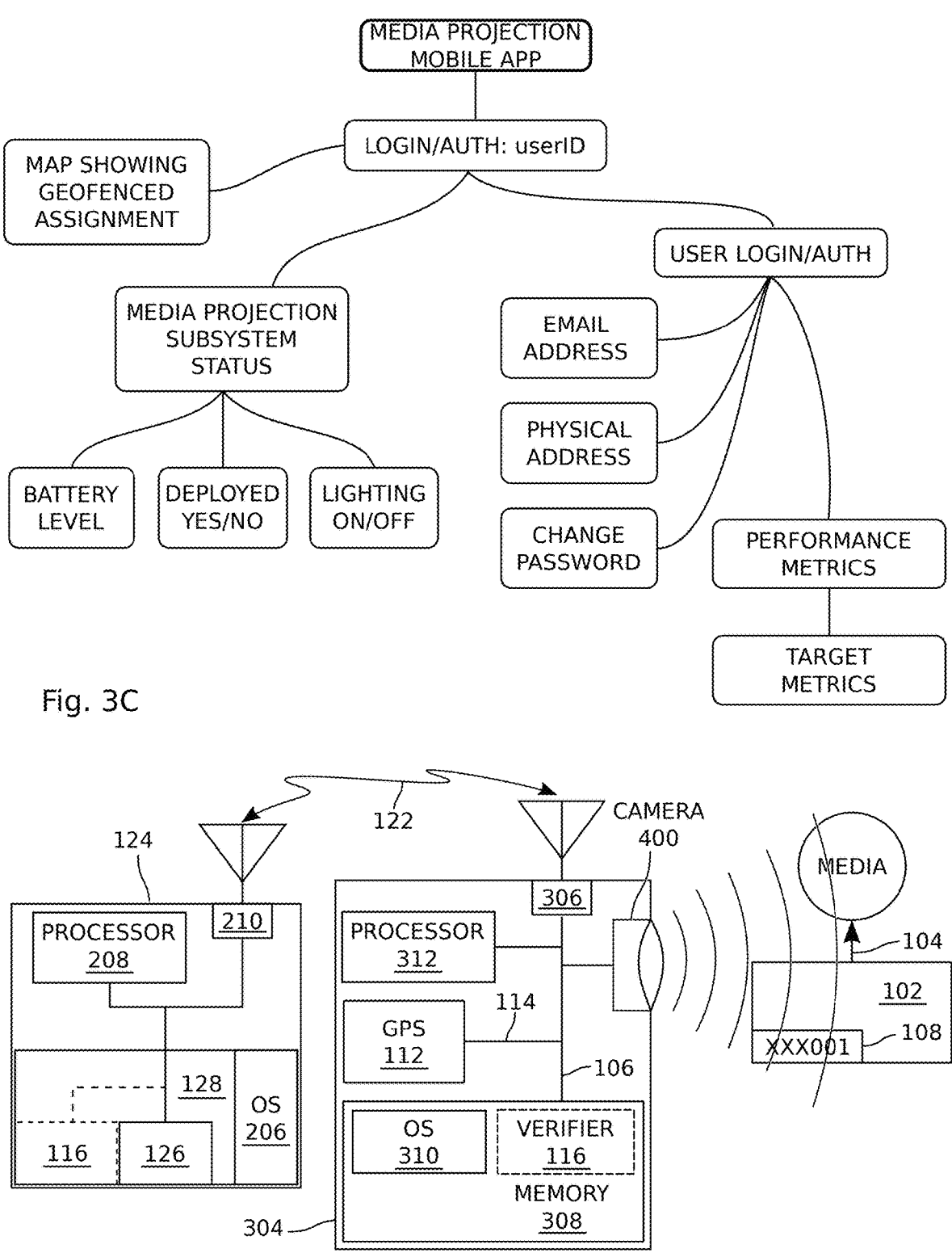
FIG. 4 is a schematic block diagram depicting the system of FIGS. 1A and 1B partially enabled using photographic images.

FIGS. 3A through 3C are a schematic block diagrams depicting the system of FIGS. 1A and 1B partially enabled with a personal communications device. As used herein, a personal communications device is a device capable of wirelessly transceiving communications. A conventional smartphone is an example of such a device. Otherwise, the personal communications device may be a smart watch, tablet computer, laptop computer, personal computer, or the equivalent. The personal communications device may be capable of cellular, WiFi, and Bluetooth communications. In addition, the personal communications device may be a customized smartphone or proprietary device capable of nanoscale, near-field communication (NFC), body (BAN), personal (PAN), near-me (NAN), or wireless local area network (WLAN) to name a few examples. In additional, the personal communications device may also be capable of hardline (e.g., Ethernet) communications, and capable of downloading memory-stored information into peripheral memory devices.

In this aspect, the identifier 108 includes a short-range wireless device 300, embedded with the media projection subsystem 102, transmitting the identification code. Likewise, the media projection subsystem 102 includes a short-range wireless device 302 for transmitting the enablement signal. In one aspect not shown, the identifier and media projection subsystem may use the same transmitter. Further, the short-range wireless device(s) may be transceivers if the system employs a handshaking mechanism. The communications subsystem is a personal communications device 304 that includes a wireless device 306 to receive the identification code and enablement signal, the GPS receiver 112, an OS 310, and processor 312. The personal communications device 304 has a non-transitory memory 308. The verifier 116 is enabled as a sequence of processor executable instructions, stored in the memory, for processing the verification information. Alternatively, as shown in phantom, the verifier may be embedded with the server 124.

Advantageously, the short range communications require that the personal communications device 304 be in close proximity to the media projection subsystem 102. As a result, the GPS location measurements accurately describe the location of the media projection subsystem 102. In some aspects, the personal communications device wireless unit 306 is also only capable of short range communications, to further ensure accurate GPS location measurement. Although the communications 122 to the server 124 are depicted as wireless, they may alternatively be enabled with hardline protocols or by downloading personal communications device memory on a peripheral memory card.

FIG. 3B depicts some overall media performance algorithm components. FIG. 3C depicts some aspects of an exemplary media projection mobile application.

FIG. 4 is a schematic block diagram depicting the system of FIGS. 1A and 1B partially enabled using photographic images. In this aspect, the identifier 108 is an identification code, as shown XXX001, physically marking the media projection subsystem 102. Again, the communications subsystem is a personal communications device 304. The personal communication device 304 comprises a camera 400 to photograph the identification code and the deployment of the media projection subsystem. The GPS receiver 122 may be embedded with the personal communications device, as shown. Alternatively but not shown, the GPS receiver may be embedded with the media projection subsystem, and communicate GPS location data to the personal communications device via a wireless link. The verifier 116 is shown embedded in the personal communications device memory 308, but alternatively as shown in phantom, it may be embedded in the memory of the server. Wherever the verifier 116 is embedded, it recognizes the photographs of the identification code and media projection subsystem deployment, respectively, as the identification code and enablement signal. As another alternative, an AI mapping analysis application may determine location from the photographs.

Figure 5:
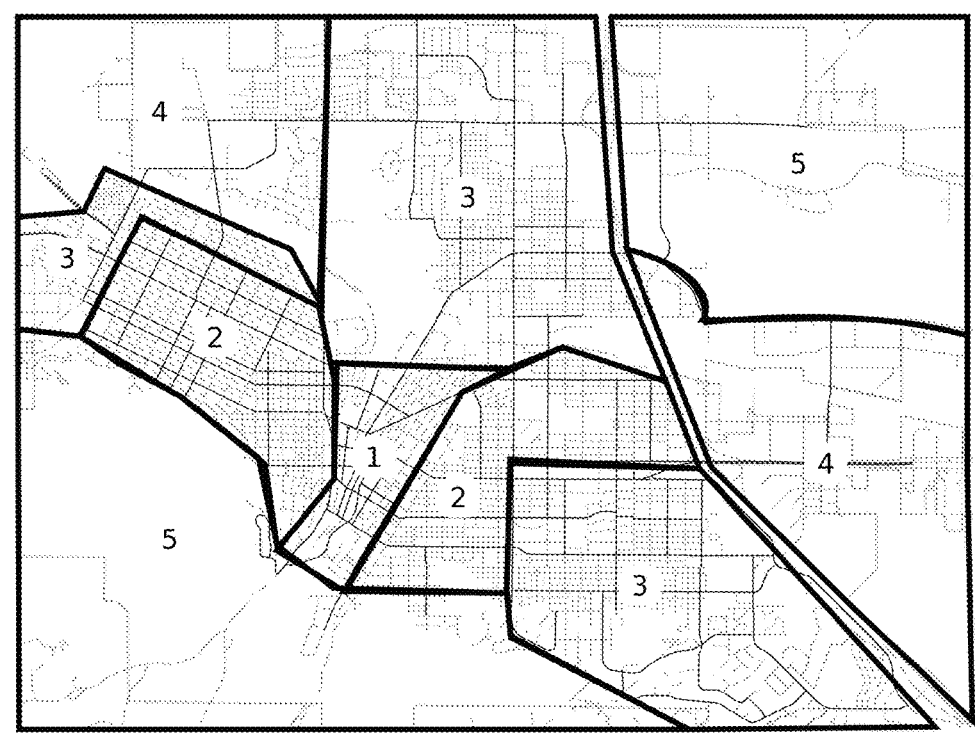
FIG. 5 is a plan view of an exemplary target location weighting map.

FIG. 5 is a plan view of an exemplary target location weighting map. Region 1 on the map may be associated with a major highway, and deployment of the media projection subsystem in this region rates a relatively high value. Region 2 is located in a city downtown area and may rate an even higher value. Regions 3 and 4 may be suburban areas, with the values associated with Region 3 being higher because of a greater population density. Region 5 may be rural and have the smallest value. In one aspect, the target location weighting map is stored and maintained in the server. Components of the media projection system (e.g., a verifier application stored in a personal communications device) may access, and perhaps upload, the target location weighting map so as to determine the optimum position for locating the system. Alternatively, a separate but associated mobile map application may be used.

Figure 6A:
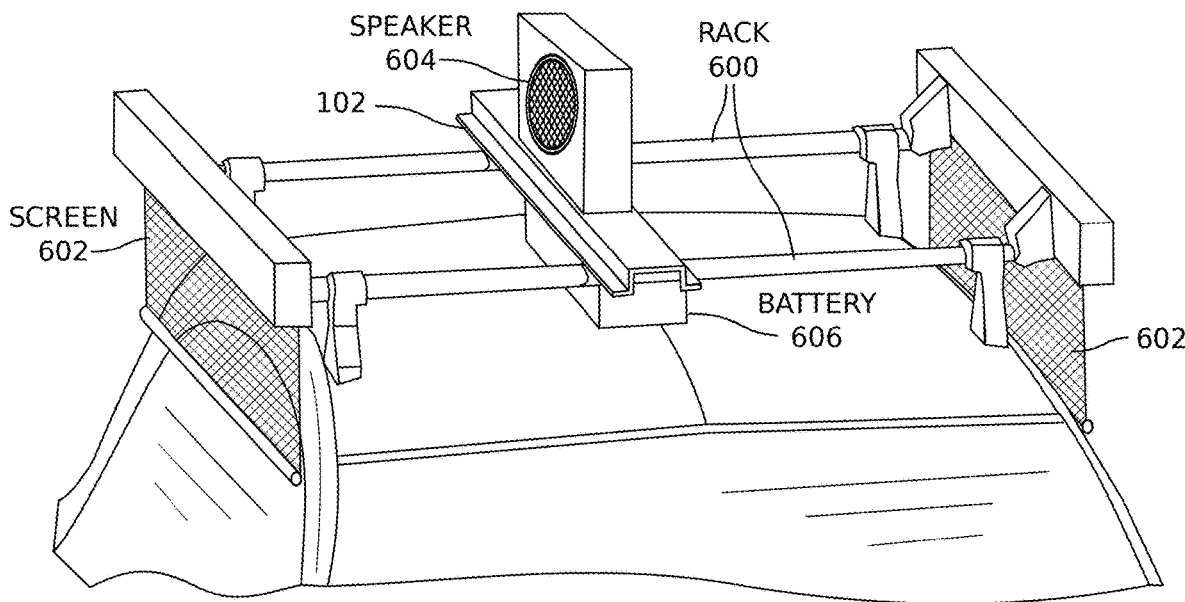
FIGS. 6A through 6C are perspective views depicting the media projection subsystem associated with an exemplary vehicle mobile platform.
Figure 6B:
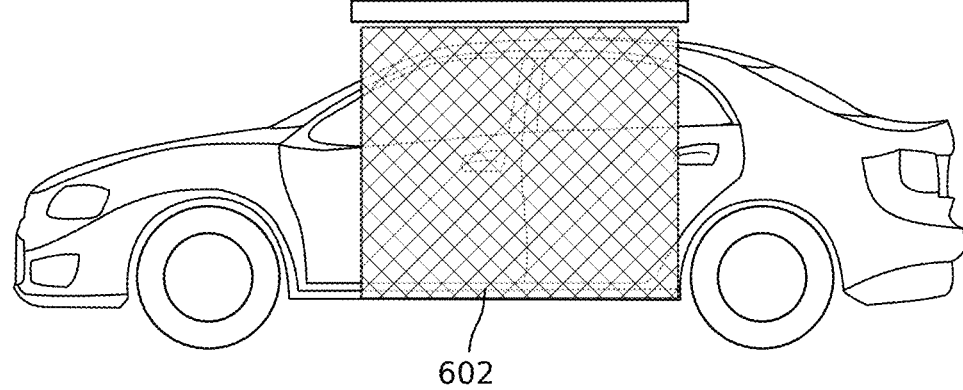
Figure 6C:
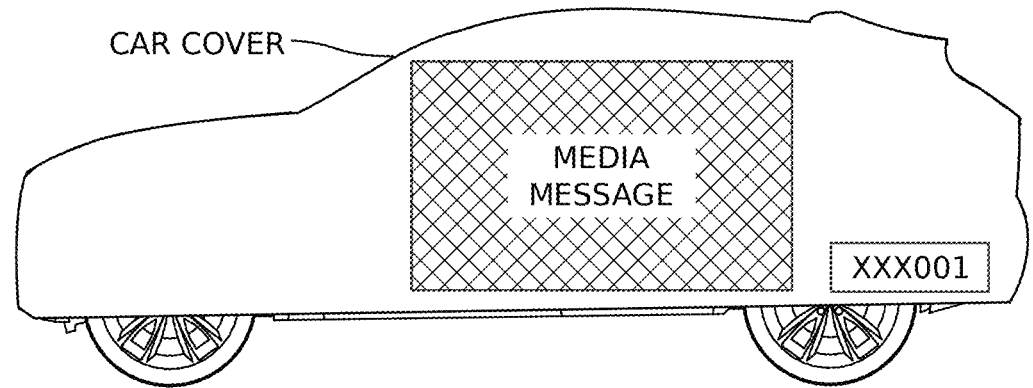

FIGS. 6A through 6C are perspective views depicting the media projection subsystem associated with an exemplary vehicle mobile platform. In FIGS. 6A and 6B the media projection subsystem is mounted on the roof of a vehicle. The identifier, GPS receiver, and verifier are not explicitly depicted. These components may be internal to the chassis housing the media projection subsystem 102. As described above, a GPS receiver and verifier may be embedded in other parts of the system. The media projection subsystem 102 is mounted to a roof rack 600. In this example, the media projection subsystem 102 may use a screen 602 to project image data. As shown, the screen 602 may be retractable. The screen 602 may be printed with a fixed advertising message, warning, or alert. Alternatively, the screen may be fixed or stationary. In one aspect, not shown, the media projection subsystem 102 further comprises a light projecting device for illuminating the screen with the media image, or for simply illuminating a fixed printed message at night. In another aspect, the screen includes a field of light emitting diodes (LEDs) or liquid crystal display (LCD) for projecting (i.e., creating) a visual image. In general, any type of imaging system, such as a conventional projector, may be used to create or transfer an illuminated message onto a screen or cover. As noted above, in one aspect the light projection system is capable of receiving updated media from the server, or capable of projecting different types of media packages stored in memory. In one aspect, the media presented may include a quick response (QR) code, matrix barcode, or watermark that can be downloaded by a viewer, and used as a coupon in a subsequent purchase, as a metric of efficacy of the media presentation. Optionally, in combination with or as an alternative to the projection of image media, the system may include a speaker 604 to broadcast an audible sound as the media. In one aspect, the system includes a battery 606 which may be used to power retractable screens or provide power for illuminating the screen(s).

The device housing may be constructed of a weather and ultraviolet (UV) resistant molded hard plastic, synthetic material, or metal. The device housing may be painted various colors. The leading edge portion of the device housing that faces the front of the automobile can be aerodynamic to reduce wind drag and noise. Located at or near the bottom of the device housing are openings that allow the fabric car cover to be deployed and retracted. The device housing may be an automated roof mounted case. Alternatively, the top portion of the device may be removed manually by the vehicle driver and deployed. As an alternative to the rack, the housing may be attached by vibration resistant bolts, suction cups, screws, clips, or magnetic devices that attach to the roof of the vehicle and that are capable of keeping the device affixed to the roof during transit or inclement weather. The perimeter of the device housing may include a row of continuous or intermittent LED lights directly under a small rib or fin of the housing that directs the emanating LED light in a downward fashion over and across the fabric cover to illuminate it during periods of darkness or low light. On the vertical portions of the device housing facing the sides, and/or front and rear of the automobile, are panels that can be painted or impregnated with logos or lettering. In some aspects the housing projects a visual image (e.g., a hologram) without the requirement of a fabric or backdrop.

FIG. 6C depicts the media projection subsystem enabled as a car cover. In this aspect, the media presentation is more likely to be a fixed stationary message or picture. If operated in cooperation with a personal communications device as in FIG. 4, the car cover need not include a power source, as the personal communications device can photograph an identifier printed on the cover while simultaneously verifying that the cover is deployed (as shown). Alternatively, enablement of the system can be measured with an embedded camera or photodetector, with the use of short-range transmitters as described in FIG. 3A, or with the use of communications subsystem.

The enablement of the media projection subsystem using a screen can be measured in a number of different ways. In the case of a screen, a mechanical or electrical switch, embedded camera, photodetector detecting ambient light, laser reflecting off an extended reflective surface of an extended screen may detect the deployment of the screen. In the case of a more active presentation system, the enablement of an LED field or light projection unit can act as proof of enablement. Otherwise, the detection of a barcode, QR code, radio frequency identification (RFID), or laser read detector can support this function.

Figure 7:
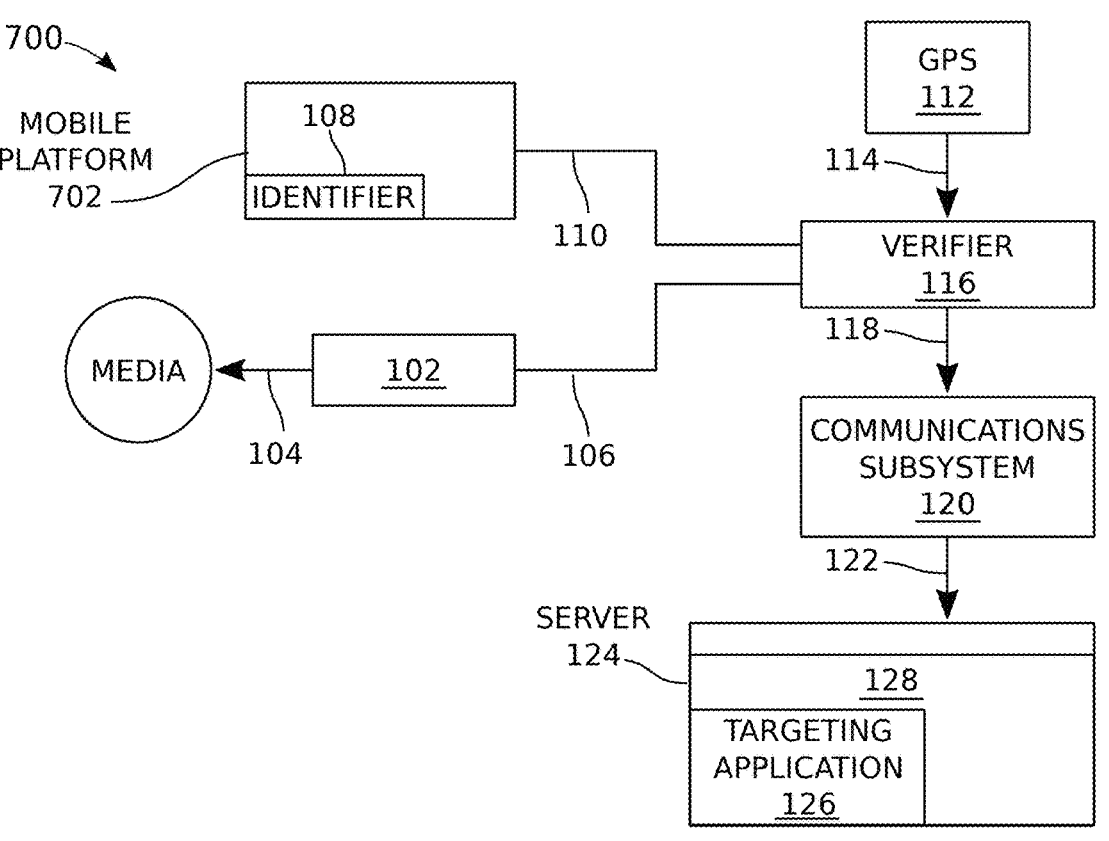
FIG. 7 is a schematic block diagram depicting a system for monitoring the occupation of a geographic location by a mobile platform.

FIG. 7 is a schematic block diagram depicting a system for monitoring the occupation of a geographic location by a mobile platform. The system 700 comprises a mobile platform 702 capable of occupying a geographic location and a location device 112 (e.g., GPS receiver) having an interface on line 114 to supply mobile platform geographic location information. For example, the mobile platform may be a powered vehicle, a towed trailer or cart, or a structure that occupies space and can be carried and manipulated by hand. An identifier 108 is associated with the mobile platform 702 and has an interface on line 110 to supply an identification code. A verifier 116 has an interface for receiving the geographic location information and the identifier, and an interface on line 118 to supply verification information responsive to the geographic location and identifier. A communications subsystem 120 has an interface to receive verification information and an interface on line 122 to transmit the verification information. A server 124, enabled as one of the above-described variations, has a communications interface to accept the verification information and a non-transitory memory 128 to store the verification information.

The identifier 108 is associated with a first entity, and the system may further comprise a targeting application 126. The targeting application 126 is stored in the server memory 128, and is enabled as a sequence of instructions for directing or suggesting a target location to the first entity in response to analyzing the verification information. Similar to the targeting application described above in FIGS. 1-5, the targeting application 126 calculates a target location weight responsive to a geographic location occupied by the mobile platform. That is, a target location weight may be response to geographic location factors such as proximate vehicular traffic, line of sight, proximate pedestrian traffic, proximity to cultural events, proximity to cultural facilities, and combinations thereof. Other weighting factors may include the time of day, the day of the week, the date, the length of time the media is being projected, and combinations thereof. This system may be useful, as described above, for ensuring that certain areas are blocked and subsequently made available for cultural events and priority vehicle parking. As another example, the system may be used to determine that a rental car or scooter has been returned to a proper specified location. Although the target locations and weights may be predetermined, in some aspects the weighting for non-predetermined areas may be calculated concurrently with the deployment of the media projection subsystem. That is, the target locations and the target location weights need not necessarily be predetermined.

In one aspect, system 700 optionally comprises a selectively enabled media projection subsystem 102 mounted to the mobile platform 702. Then, the verifier 116 additionally accepts enablement signals on line 106 from the media projection subsystem 102 if media is deployed, and supplies verification information on line 118 responsive to determining the enablement of the media projection subsystem.

Similar to the system described above in FIG. 3, and therefore mentioned only briefly, the identifier and the media projection subsystem may employ short-range wireless transmitting devices, and the communications device is a personal communications device. Then, the GPS receiver can be embedded with the mobile platform, media projection subsystem if used, or the personal communications device.

Similar to the system described above in FIGS. 2A and 2B, the GPS receiver, identifier, and communication subsystems may be embedded with the mobile platform, or the media projection subsystem if used. Similar to the system described above in FIG. 4, the identifier may be an identification code physically marking the mobile platform or media projection subsystem if used. The communications subsystem may be a personal communications device including a camera to photograph the identification code and the deployment of the media projection subsystem if present, and the verifier recognizes the photographs of the identification code and media projection subsystem deployment (if present), respectively, as the identifier and the enablement of the media projection subsystem.

In one aspect, the system further comprises a camera 706 having an output on line 708 to supply images of the geographic location proximate to the mobile platform. The communications subsystem 120 receives the images from the camera and transmits them to the server 124 for storage in memory. The images may be evaluated to modify the target location weight, to verify the occupation of a particular location, or determine location.

Figure 8:
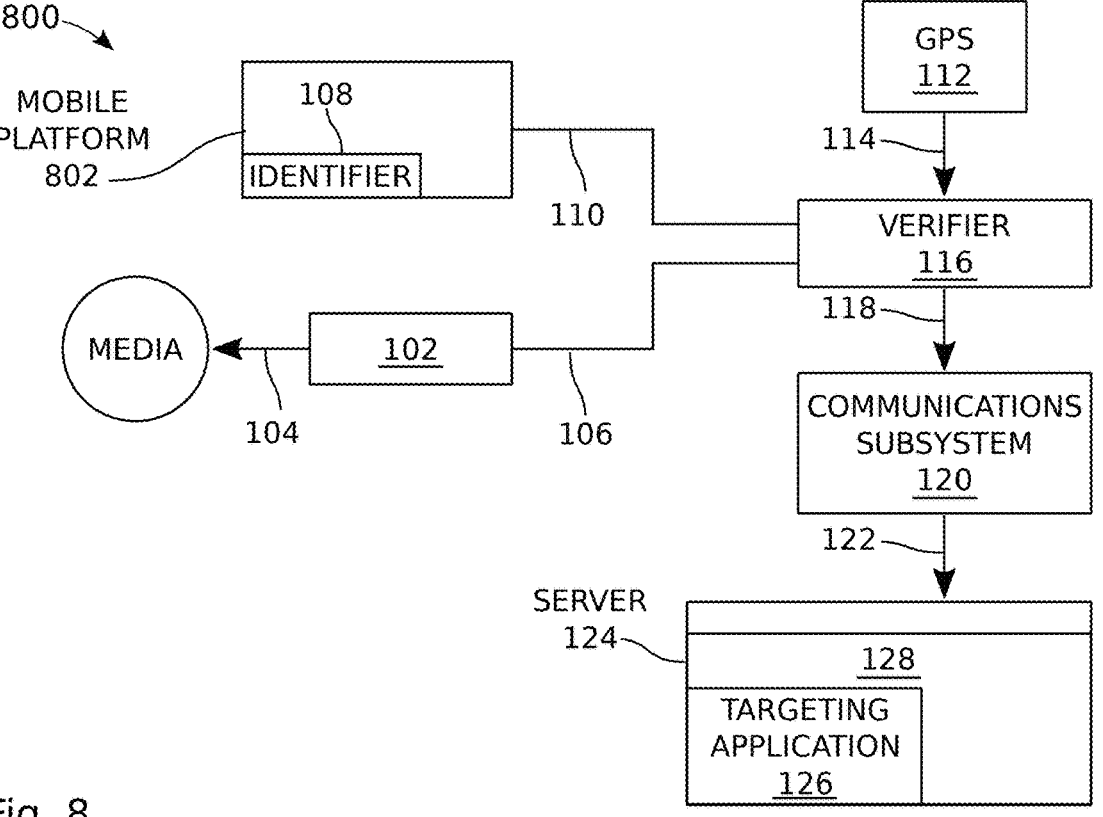
FIG. 8 is a schematic block diagram depicting a system for monitoring the provision of media distributed by a mobile platform.

FIG. 8 is a schematic block diagram depicting a system for monitoring the provision of media distributed by a mobile platform. The system 800 comprises a mobile platform 802. Like the system described in FIG. 7, the mobile platform 802 is any portable or moveable vehicle or structure capable of being parked and temporarily occupying a location. In addition, mobile platform 802 includes moving vehicles, trailers or carts under active tow, shopping carts, backpacks, and drones to name a few examples. A selectively enabled media projection subsystem 102 is mounted to the mobile platform 802 with an interface to supply an enablement signal when the media projection subsystem is projecting media. An identifier 108 is associated with a first entity and the media projection subsystem 102, and has an interface on line 110 to supply an identification code. A location device 112 (e.g., a GPS receiver) has an interface on line 114 to supply media projection subsystem or mobile platform geographic location information, which should be the same. A verifier 116 has an interface for receiving the geographic location, the identifier, and the enablement of the media projection system, and an interface to supply verification information responsive to the geographic location, identifier, and enablement of the media projection subsystem. A communications subsystem 120 has an interface to receive verification information and an interface on line 122 to transmit the verification information. A server 124, enabled as one of the above-described variations, comprises a communications interface to accept the verification information and a non-transitory memory 128 to store the verification information. In one aspect, the server 124 further comprises a targeting application 126, stored the memory 128, enabled as a sequence of processor executable instructions for directing or suggesting target locations to the first entity in cooperation with analyzing the verification information.

In one aspect, the targeting application 126 supplies or calculates a plurality of weighted target location responsive to a corresponding plurality of geographic locations through which the mobile platform traverses. In other words, the value of the target locations may change constantly as the mobile platform continually moves through different locations. Other details of the system of FIG. 8 are essentially identical to the features and variations presented in the descriptions of FIGS. 1-4 above, and are not repeated here in the interest of brevity.

The systems described above can be adapted for use in a model where an advertiser pays for service based upon performance. For example, an advertising client may contract with a system provider stipulating a target market and deployment hours/rate. The system provider determines geo-fenced locations that meet or exceed the advertiser's target market based on location, demographics, traffic, population density, and other variables. In one variation, system enablers (e.g., entities or drivers) use a mobile application in conjunction with the media projection subsystem that is deployed in geo-fenced region for a period of time. Platform deployment time, location, quality code, and user information are recorded by the server. A system provider algorithm determines platform performance based on length of deployment, contracted rate, parking cost reimbursement, and location quality code.

As noted above, in one aspect a personal communications device mobile application communicates with the media projection system using a near-field, low power (e.g., Bluetooth) protocol. This mobile application may require user authentication and handshaking with media projection system as a means of identification and verification. The mobile application may provide the user with geo-fenced target deployment assignments, user account info, module status, and module controls. Driver deployment is logged when the driver pairs and connects the application with the media projection subsystem, and in one aspect, the driver deploys the media advertisement by pulling down a vinyl roller. Location and deployment time metrics are recorded using mobile GPS/cell-tower telemetric capabilities and time features. The user data and metrics may be transmitted using cellular wireless electronic communication to the server.

As at least partially seen in FIGS. 6A and 6B, the media projection system may include a roof mounted rack, battery compartment, pulldown vinyl advertisement, microcontrollers, and microchip wireless antenna. The projection system is mounted to a vehicle and the driver may then be directed to preferred deployment locations using the mobile map application. That is, a mobile map application may display geo-fenced locations corresponding to areas where the driver is eligible to make money by deploying advertising media. The driver syncs their mobile device application to the media projection system to control and confirm the device location, deployment, and length of deployment.

The systems described above support a targeted mobile sign system, where the mobile sign is selectively deployed. As explained above, the sign may be a car cover with an advertising logo or message. In cooperation with the deployment of the sign, an organization or user associated with the sign is directed to preferred locations. For example, the deployment of the sign along a busy urban thoroughfare is likely to have a greater value than deployment on a suburban side-street. Other factors that may be used to calculate target value may include the time of day and the length of deployment. Thus, some key features to the system are determining that the sign has actually been deployed, and once deployed, the location of the sign. In some aspects, the sign is a type of visual display, but other aspects may include just an auditory presentation, a combination visual and auditory presentation, or a presentation that is able to interact with a proximate viewer.

In one aspect, the sign communicates a deployment message and supporting systems receive the deployment message and determine the deployment location. This information can be relayed in real-time to a server entity. Alternatively, the information can stored in memory of the supporting system and transferred to the server at periodic intervals or upon the attainment of predetermined metrics such as the number of deployments. In this aspect, the sign can be enabled with a relatively simple transmitting device or memory.

The supporting system may be a smartphone with a proprietary application for interrogating or receiving interrogations from the sign. For example, the system may assume that smartphone is both enabled with a GPS application, and in the same approximate location as the deployed sign, if the sign uses a short range communication system such as Bluetooth, NFC, or WiFi. Likewise, the supporting system may be a local or mobile WiFi hotspot, in which case the deployment signal is relayed to the server, and it may be possible for the server to determine the location of the WiFi hotspot, for example, by communicating with devices adjacent to the hotspot that are enabled with GPS receivers.

In another aspect, the sign includes mechanisms for determining both deployment and location. As above, this information can be communicated to a supporting system in real-time using a wireless communications system. Again this information can be communicated to a smartphone with a proprietary application via Bluetooth, WiFi, or even cellular communications. Alternatively, the communications can be related via a WiFi hotspot, or sent more directly to the server via cellular communications. Alternatively, the deployment and location information can be stored and transferred occasionally or periodically using a wireless communications system, using a hard-wired link, or memory peripheral. In one aspect, the media projection subsystem can be equipped with inertial measurement unit (IMU), such as an accelerometer or gyroscope, to detect changes in location.

Figure 9:
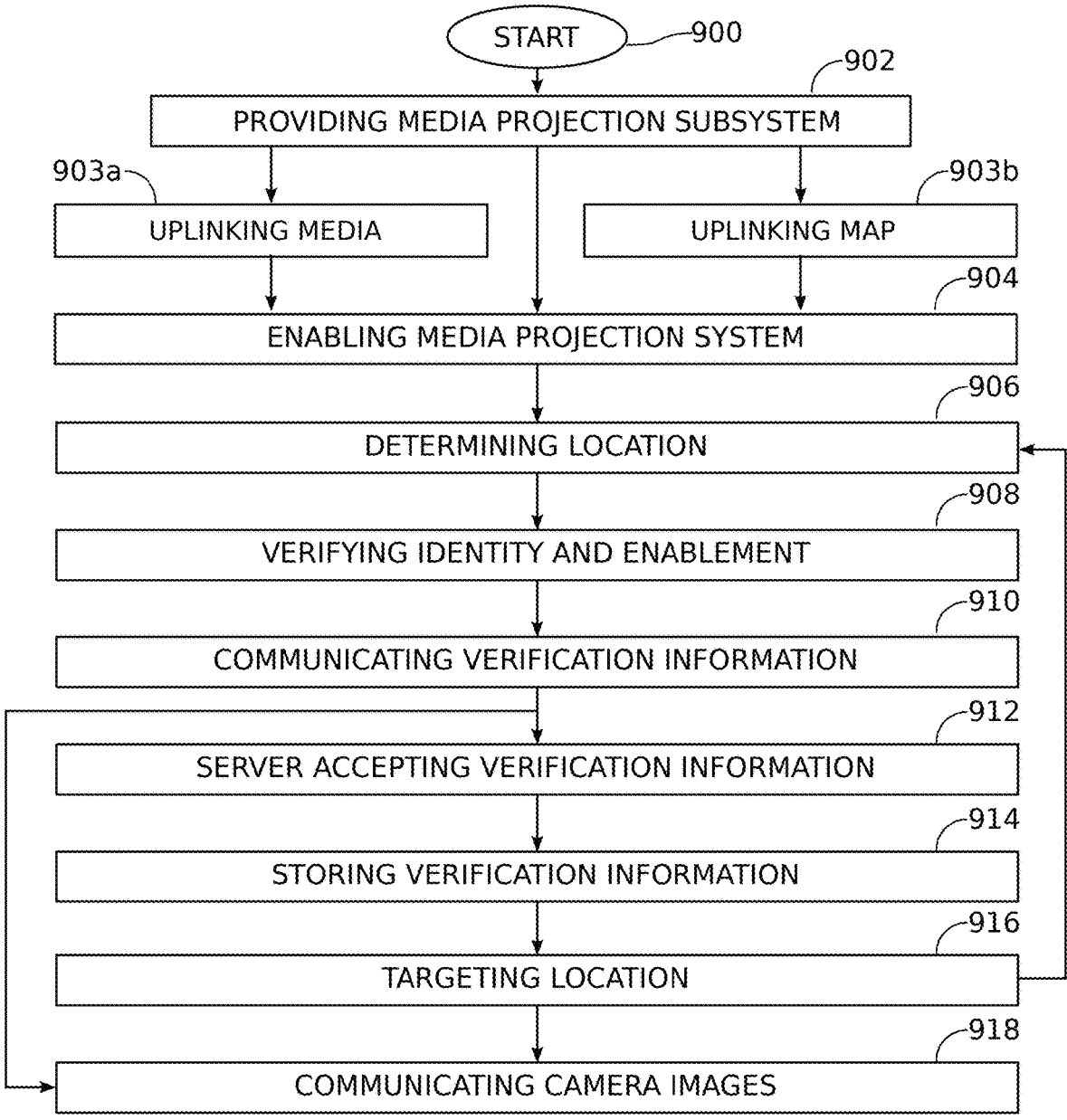
FIG. 9 is a flowchart illustrating a method for monitoring the provision of media distributed by a mobile platform.

FIG. 9 is a flowchart illustrating a method for monitoring the provision of media distributed by a mobile platform. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method steps are supported by the above system descriptions and, generally, the method follows the numeric order of the depicted steps. The method starts at Step 900.

Step 902 provides a mobile platform with an attached media projection subsystem, and an identifier associated the media projection subsystem. Exemplary media projection subsystem may comprise a car cover, fixed screen, or retractable screen for displaying a media image. The media projection subsystem may also employ a light projection device, a field of LEDs, and an audio speaker. Step 904 selectively enables the media projection subsystem. Step 906 determines the geographic location of the mobile platform. Step 908 verifies the identifier and the enablement of the media projection system. Step 910 communicates, to a server, verification information including the mobile platform location, identifier, and enablement of the media projection subsystem. As noted above, there is no necessity that these steps be performed in the particular order listed above. In Step 912 the server accepts the verification information, and in Step 914 the server stores the verification information in a non-transitory memory.

In one aspect, the identifier of Step 902 is associated with a first entity, and Step 916 directs or suggests a target location to the first entity in cooperation with analyzing the verification information using a targeting software application, stored in the server memory, and enabled as a sequence of processor executable instructions. A target location weight may be responsive to the type of geographic location occupied by the mobile platform. Some geographic location factors are proximate vehicular traffic, line of sight, proximate pedestrian traffic, proximity to cultural events, proximity to cultural facilities, and combinations thereof. A target location weight may also be responsive to factors such as the type of media being projected, the time of day, the day of the week, the date, the length of time the media is being projected, and combinations thereof. As shown with the arrow leading back to Step 906, the selection of location may be influenced by the value of the location.

In one aspect, Step 902 provides an identifier comprising a short-range wireless device transmitting an identification code, and with the media projection subsystem comprising a short-range wireless device for transmitting an enablement signal. In addition, Step 902 may further provide a personal communications device comprising a short-range wireless device to receive the identification code and enablement signal, and a GPS receiver for determining the mobile platform location. Then, verifying the identifier and the enablement of the media projection system in Step 908 includes using a verifier software application, stored in a non-transitory memory, enabled as a sequence of processor executable instructions for verifying the identification code and the enablement of the media projection subsystem. The verifier software application may be embedded with either the personal communications device or the server.

Alternatively, Step 902 embeds a GPS receiver, the identifier, and a communication subsystem with the media projection subsystem. In this case, the verifier software application is stored in a non-transitory memory of the media projection subsystem. The verification information communicated in Step 910 is communicated using the embedded communications subsystem. This method permits constant verification updates if so desired.

In another aspect, Step 902 provides the identifier as an identification code physically marking the media projection subsystem, and also provides a personal communications device including a camera to photograph the identification code and the deployment of the media projection subsystem. Then, verifying the identifier and the enablement of the media projection system in Step 908 includes recognizing the photographs of the identification code and media projection subsystem deployment, respectively, as the identifier and the enablement of the media projection subsystem.

In one aspect, Step 903a receives media uploads from the server, and enabling the media projection subsystem in Step 904 includes the media projection subsystem projecting the media uploads. Optionally, Step 903b uplinks a target location weighting map, which may influence the deployment location of Step 904. In another aspect, Step 902 provides a camera embedded with the media projection subsystem, and Step 918 communicates images recorded by the camera to the server for storage in memory. In another variation, the camera may be used in verifying system enablement in Step 908.

System and methods have been provided for monitoring the deployment of media and the occupation of geographic locations. Examples of particular message structures, schematic block linkages, and hardware units have been presented to illustrate the invention. However, the invention is not limited to merely these examples. Other variations and embodiments of the invention will occur to those skilled in the art.

We claim:

1. A system for mobile platform location management, the system comprising:
   a server comprising:
      a server non-transitory memory;
      a server processor;
      a geofence mapping software application stored in the server memory, enabling a sequence of processor executable instructions permitting the selection of a stationary location and the assignment of the selected stationary location to a corresponding mobile platform;
      a server communications subsystem to transmit the selected stationary location to the mobile platform;
   the mobile platform comprising:
      a mobile platform non-transitory memory;
      a mobile platform processor;
      a location device to supply a geographic location of the mobile platform;
      a mobile platform communications subsystem having an interface to receive the selected stationary location from the server communications subsystem;
      a targeting software application stored in the mobile platform memory, enabling a sequence of processor executable instructions for receiving the selected stationary location from the mobile platform communications subsystem and the mobile platform geographic location from the location device, and generating an enablement signal acknowledging receipt of the selected stationary location signal and including the mobile platform geographic location;

wherein the mobile platform communications subsystem interface transmits the enablement signal to the server communications subsystem; and,
   wherein the server further comprises:
      a verifier stored in the server memory, enabling a sequence of processor instructions for comparing the enablement signal received from the server communications subsystem with the selected stationary location received from the geofence mapping application.

2. The system of claim 1 wherein the stationary location is selected from a plurality of value weighted stationary locations.

3. The system of claim 2 wherein a reward is provided to an entity associated with the mobile platform in response to the value of the stationary location.

4. The system of claim 1 wherein the stationary location has a weighted value responsive to factors selected from the group consisting of proximate vehicular traffic, line of sight, proximate pedestrian traffic, proximity to cultural events, proximity to cultural facilities, a time of day, a day of the week, a date, the duration of stationary location deployment, and combinations thereof.

5. The system of claim 1 wherein the verifier is software application enabled as a sequence of processor executable instructions, and stored in the server non-transitory memory, for comparing the targeting instructions and enablement signal.

6. The system of claim 1 further comprising:
   a media projection subsystem attached to the mobile platform projecting media selected from the group consisting of a displayed image, broadcast sound, or a combination thereof.

7. The system of claim 6 wherein the media projection subsystem is a roof mounted device with display side panels.

8. The system of claim 7 wherein the roof mounted display side panels remain in place on an exterior of a mobile platform roof during transportation.

9. The system of claim 6 wherein the mobile platform communications subsystem receives media uploads from the server; and,
   wherein the mobile platform communications subsystem provides the media uploads to the media projection subsystem.

10. The system of claim 1 further comprising:
   a camera attached to the mobile platform, having an output to supply images of the geographic location proximate to the mobile platform; and,
   wherein the mobile platform communications subsystem receives the images from the camera and transmits them to the server.

11. The system of claim 1 wherein the enablement signal includes a duration of mobile platform stationary location deployment.

12. A method for mobile platform location management, the method comprising:
   a server targeting application generating targeting instructions including a selected stationary location assigned to a corresponding mobile platform;
   the mobile platform receiving communications from the server including the targeting instructions
   the mobile platform occupying the selected stationary location;
   the mobile platform communicating, to the server, an enablement signal acknowledging receipt of the targeting instructions and including the mobile platform geographic; and, a server verifier comparing the targeting instructions to the enablement signal.

13. The method of claim 12 wherein the stationary location is selected from a plurality of weighted stationary locations.

14. The method of claim 12 wherein the stationary location has weighted value responsive to factors selected from the group consisting of proximate vehicular traffic, line of sight, proximate pedestrian traffic, proximity to cultural events, proximity to cultural facilities, the time of day, the day of the week, the date, the length of time the mobile platform is deployed in the stationary location, and combinations thereof.

15. The method of claim 12 further comprising:
providing a media projection subsystem; and,
selectively enabling the media projection subsystem to project media messages.

16. The method of claim 15 wherein providing the media projection subsystem includes providing a roof mounted device with display side panels.

17. The method of claim 16 wherein the roof mounted display side panels remain in place on an exterior of a mobile platform roof during transportation.

18. The method of claim 15 further comprising:
receiving media uploads from the server; and,
wherein selectively enabling the media projection subsystem includes the media projection subsystem projecting the media uploads.

19. The system of claim 12 wherein the enablement signal includes a duration of mobile platform stationary location deployment.

* * * * *